United States Patent
Sekiya et al.

(10) Patent No.: US 8,417,429 B2
(45) Date of Patent: Apr. 9, 2013

(54) VEHICLE BRAKE FLUID PRESSURE CONTROL APPARATUS

(75) Inventors: Tomoaki Sekiya, Nagano (JP); Masashi Kobayashi, Nagano (JP)

(73) Assignee: Nissin Kogyo Co., Ltd., Nagano (JP)

( * ) Notice: Subject to any disclaimer, the term of this patent is extended or adjusted under 35 U.S.C. 154(b) by 305 days.

(21) Appl. No.: 12/948,324

(22) Filed: Nov. 17, 2010

(65) Prior Publication Data

US 2011/0118949 A1 May 19, 2011

(30) Foreign Application Priority Data

Nov. 19, 2009 (JP) ................................ 2009-263875

(51) Int. Cl.
*B60T 8/46* (2006.01)
*B60T 8/34* (2006.01)

(52) U.S. Cl. .......... 701/79; 701/78; 303/113.1; 303/157

(58) Field of Classification Search .................... 303/157
See application file for complete search history.

(56) References Cited

U.S. PATENT DOCUMENTS

| | | | | |
|---|---|---|---|---|
| 5,125,723 A | * | 6/1992 | Sakuma et al. | ............... 303/156 |
| 5,187,666 A | * | 2/1993 | Watanabe | ........................ 701/79 |
| 6,671,606 B2 | * | 12/2003 | Ishikawa et al. | ................ 701/71 |
| 6,950,738 B2 | * | 9/2005 | Inagaki et al. | ................... 701/71 |

FOREIGN PATENT DOCUMENTS

| | | |
|---|---|---|
| JP | 1282061 A | 11/1989 |
| JP | 3246157 A | 11/1991 |
| JP | 8295222 A | 11/1996 |
| JP | 2001287633 | 10/2001 |

OTHER PUBLICATIONS

Japanese Patent Office Action for Application No. 2009-263875 dated Aug. 9, 2011.

* cited by examiner

*Primary Examiner* — Michael J Zanelli
(74) *Attorney, Agent, or Firm* — Andrew M. Calderon; Roberts Mlotkowski Safran & Cole, P.C.

(57) ABSTRACT

A vehicle brake fluid pressure control apparatus includes: a controller configured to control fluid pressures in wheel brakes to increase or reduce by controlling normally open electromagnetic valves and normally closed electromagnetic valves, wherein the controller perform: a pressure reducing in a pressure reducing cycle in which a basic pressure reducing control and a gradual pressure control are performed continuously in a case that the controller determines to execute a pressure reducing control with wheel speeds decreasing; a pressure reducing control in a basic pressure reducing amount in the basic pressure reducing control; and a temporary holding control for holding the fluid pressure and a fine pressure reducing control for executing a pressure reducing in an amount smaller than the basic pressure reducing amount in a case that the wheel speeds tend to decrease after the temporary holding control in the gradual pressure reducing control.

8 Claims, 7 Drawing Sheets

VEHICLE BRAKE FLUID PRESSURE CONTROL APPARATUS

BACKGROUND

1. Field of the Invention

The present invention relates to a vehicle brake fluid pressure control apparatus and more particularly to a vehicle brake fluid pressure control apparatus which realizes a pressure reducing in a suitable pressure reducing amount for a road surface friction coefficient.

2. Description of the Related Art

Conventionally, there exist vehicle brake fluid pressure control apparatus for controlling the brake fluid pressure in accordance with road surface conditions. As one of them, for example, JP-A-2001-287633 discloses such a vehicle brake fluid pressure control apparatus. In this unit, a configuration is disclosed in which a road surface friction coefficient (also referred to simply as "$\mu$") is estimated based on a wheel speed, and in the case of a low $\mu$ road, a control parameter is compensated so as to increase the pressure reducing amount, whereas in the case of a high $\mu$ road, the control parameter is compensated so as to decrease the pressure reducing amount.

However, in case the road surface on which the vehicle is running changes drastically from a low $\mu$ road surface to a high $\mu$ road surface or a road wheel is temporarily lifted from the road surface due to humps or other irregularities on the road surface, the pressure reducing amount becomes larger than necessary, whereby a drastic change in brake fluid pressure is caused or a pressure increase after the pressure reducing is delayed, leading to a problem that the driver has to feel a deteriorated braking feeling.

SUMMARY

Then, an object of the invention is to provide a vehicle brake fluid pressure control apparatus which provides an improved braking feeling by performing a pressure reducing control with a suitable pressure reducing amount for a road surface friction coefficient.

According to an aspect of the invention, there is provided a vehicle brake fluid pressure control apparatus for controlling a fluid pressure generated in a fluid pressure source based on at least a wheel speed for transmission to a wheel brake, including: a normally open electromagnetic valve which is disposed on a fluid pressure line extending from the fluid pressure source to the wheel brake; a normally closed electromagnetic valve which is disposed on a fluid pressure line extending from the wheel brake to the fluid pressure source; and a controller configured to control a fluid pressure in the wheel brake to increase or reduce by controlling the normally open electromagnetic valve and the normally closed electromagnetic valve, wherein the controller performs: a pressure reducing in a pressure reducing cycle in which a basic pressure reducing control and a gradual pressure control are performed continuously in a case that the controller determines to execute a pressure reducing control with wheel speed decreasing; a pressure reducing control in a basic pressure reducing amount in the basic pressure reducing control; and a temporary holding control for holding the fluid pressure and a fine pressure reducing control for executing a pressure reducing in an amount smaller than the basic pressure reducing amount in a case that the wheel speed tend to decrease after the temporary holding control in the gradual pressure reducing control.

According to the vehicle brake fluid pressure control apparatus configured in the way described above, the controller substantially reduces the fluid pressure in the basic pressure reducing amount through the basic pressure reducing control and thereafter holds the fluid pressure for a predetermined period of time through the temporary holding control in the gradual pressure reducing control in accordance with wheel speed. In a case that the tendency of wheel speed is changed from the decreasing tendency to the increasing tendency through the temporary holding control, that is, the road wheel start to follow the road surface, the pressure reducing ends. In a case that the wheel speed still exhibits the decreasing tendency even after the temporary holding control, the fine pressure reducing control is performed in which the pressure reducing is executed in the pressure reducing amount smaller than the basic pressure reducing amount. Because of this, the pressure reducing can be performed in the suitable pressure reducing amount by controlling the pressure reducing amount while observing how much the road wheels T are recovered from the lockup tendency. Because of this, an extra pressure reducing on the high $\mu$ road can be reduced so as to minimize a change in brake fluid pressure. In addition, the braking feeling can be improved by preventing a delay in increasing the fluid pressure.

The controller may repeat the temporary holding control and the fine pressure reducing control while the wheel speed tend to decrease in the gradual pressure reducing control.

According to the configuration described above, since the temporary holding control and the fine pressure reducing control are performed repeatedly while observing how much the road wheel is restored from the lockup tendency in the gradual pressure reducing control, the pressure reducing control with a more suitable pressure reducing amount in accordance with the restoration condition of the road wheel from the lockup tendency.

A pressure reducing amount in the fine pressure reducing control may be made small in a case that an estimated road surface friction coefficient is larger than a predetermined threshold and a vehicle body speed is smaller than a predetermined threshold.

According to the configuration described above, in a case that the road surface coefficient is high and the vehicle is driving at low speeds, since the pressure reducing amount in the fine pressure reducing control is reduced, no excessive reducing in deceleration is called for, thereby making it possible to match preferably the brake pedal traveling amount with the braking feeling.

When making small the pressure reducing amount in the fine pressure reducing control, an application time of a pulse signal for a single pressure reducing may be shortened.

By doing so, a good braking feeling can be obtained by the simple control.

A predetermined time to hold the fluid pressure in the temporary holding control may be lengthened in a case that the estimated road surface friction coefficient is larger than the predetermined threshold and the vehicle body speed is smaller than the predetermined threshold.

According to the configuration described above, in a case that the road surface coefficient is high and the vehicle is driving at low speeds, no excessive reducing in deceleration is called for, thereby making it possible to match preferably the brake pedal traveling amount with the braking feeling by delaying the timing at which the pressure reducing through the fine pressure reducing control is started.

The basic pressure reducing amount may be compensated based on a total pressure reducing amount of pressure reducing amounts used in the basic pressure reducing control and the gradual pressure reducing control in the previous pressure reducing control.

By doing so, the suitable basic pressure reducing amount for the current road surface condition can be set by reference to the previous pressure reducing cycle.

In a case that the fine pressure reducing control is not executed in the gradual pressure reducing control in the previous pressure reducing cycle, the basic pressure reducing amount may be set so as to be smaller by a predetermined amount than that in the previous pressure reducing cycle.

In a case that the fine pressure reducing control was not executed in the gradual pressure reducing control in the previous pressure reducing cycle, this means that only the basic pressure reducing amount was judged as being good enough for the pressure reducing amount needed. Therefore, the pressure reducing in the more suitable pressure reducing amount can be carried out while observing how much the road wheel is restored from the lockup tendency by making the basic pressure reducing amount smaller by the predetermined amount than that in the previous pressure reducing cycle.

In a case that the fine pressure reducing control is executed in the gradual pressure reducing control in the previous pressure reducing cycle, the basic pressure reducing amount may be set so as to be larger by a predetermined amount than that in the previous pressure reducing cycle.

In a case that the fine pressure reducing control was executed in the gradual pressure reducing control in the previous pressure reducing cycle, this means that only the basic pressure reducing amount was judged as being not good enough for the pressure reducing amount needed. Therefore, the pressure reducing in the more suitable pressure reducing amount can be carried out while observing how much the road wheel is restored from the lockup tendency by making the basic pressure reducing amount larger by the predetermined amount than that in the previous pressure reducing cycle.

According to the invention, the braking feeling can be improved by executing the pressure reducing control with the suitable pressure reducing amount.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Next, referring to the drawings as required, an embodiment of the invention will be described in detail.

Figure 1:
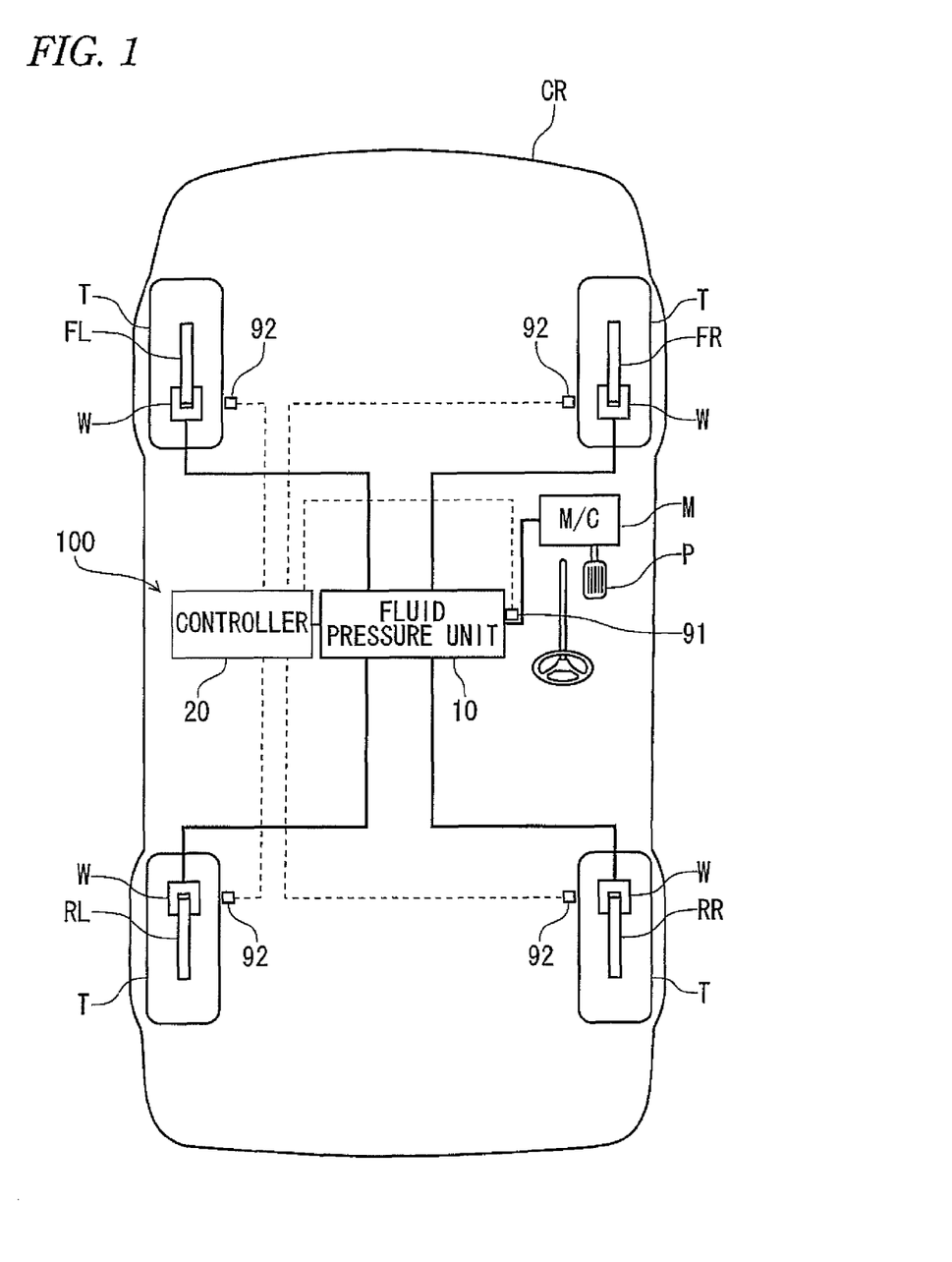
FIG. 1 is a diagram showing the configuration of a vehicle provided with a vehicle brake fluid pressure control apparatus according to an embodiment of the invention.

As is shown in FIG. 1, a vehicle brake fluid pressure control apparatus 100 is a unit for controlling individually braking forces as required which are to be applied to respective road wheels T of a vehicle CR. The vehicle brake fluid pressure control apparatus 100 includes mainly a fluid pressure unit 10 in which hydraulic or fluid pressure lines and various types of components are provided and a controller 20 as an example of a control device for controlling the various types of components in the fluid pressure unit 10 as required.

The respective road wheels T include wheel brakes FL, RR, RL, FR, and the respective wheel brakes FL, RR, RL, FR include wheel cylinders W which generate braking forces by fluid pressures supplied from a master cylinder M. The master cylinder M and the wheel cylinders W are individually connected to the fluid pressure unit 10. A brake fluid pressure is generated in the master cylinder M according to pedal effort (a driver's braking operation) applied to a brake pedal P, and the brake fluid pressure so generated is controlled at the controller 20 and the fluid pressure unit 10 so as to be supplied to the wheel cylinders W.

Connected to the controller 20 are a pressure sensor 91 for detecting a fluid pressure within the master cylinder M and wheel speed sensors 92 for reading wheel speeds of the respective road wheels T. This controller 20 includes, for example, a CPU, a RAM, a ROM and an input/output circuit and performs various arithmetic operations based on inputs from the pressure sensor 91 and the wheel speed sensors 92 and programs and data stored in the ROM to thereby execute a control to increase or reduce fluid pressures at the wheel brakes FL, RR, RL, FR. The controller 20 will be described in detail later.

Figure 2:
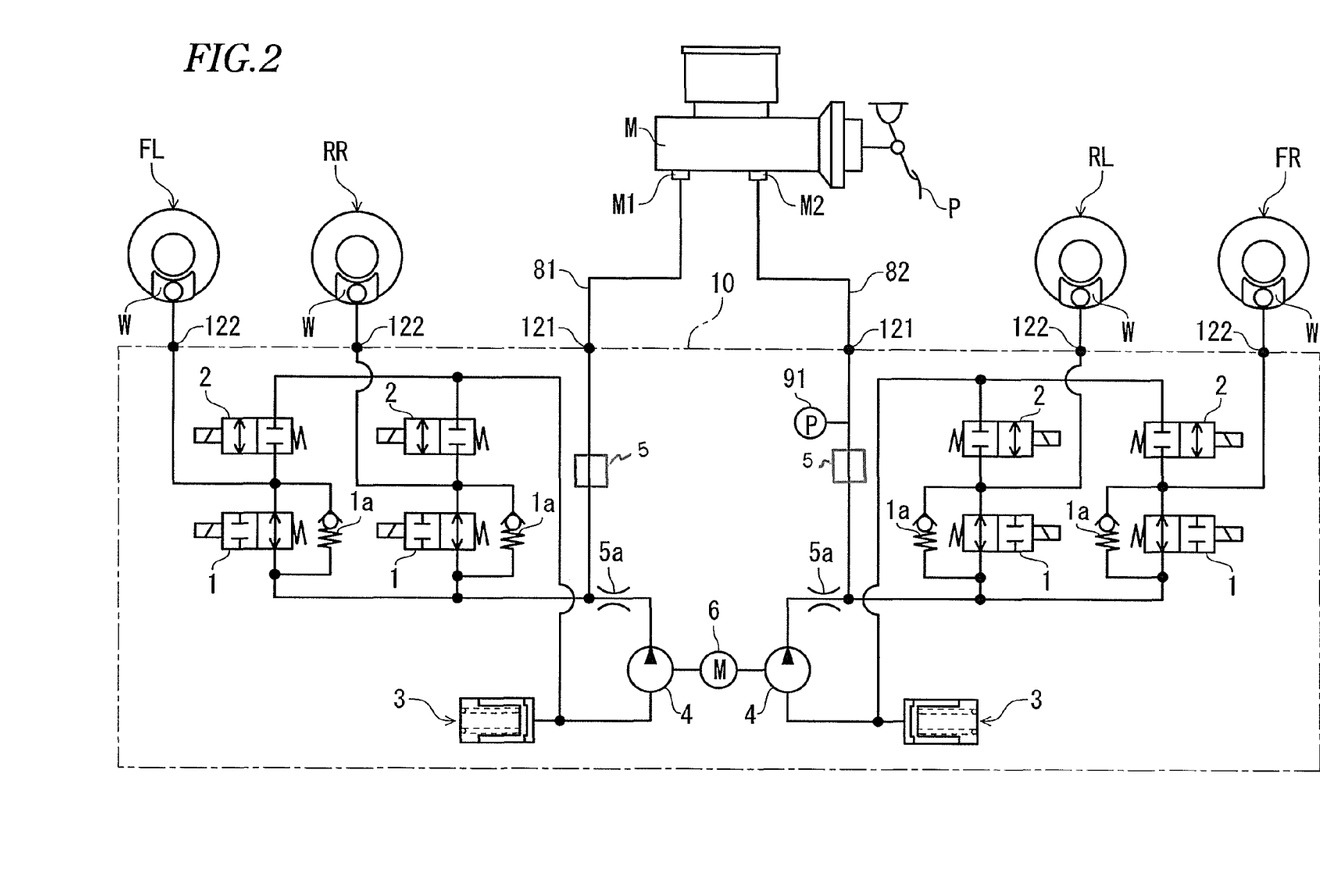
FIG. 2 is a block diagram showing the configuration of a fluid pressure unit.

As is shown in FIG. 2, the fluid pressure unit 10 is disposed between the master cylinder M and the wheel brakes FL, RR, RL, FR. Two output ports M1, M2 of the master cylinder M are connected to inlet ports 121 of the fluid pressure unit 10, and outlet ports 122 of the fluid pressure unit 10 are connected to the wheel brakes FL, RR, RL, FR. Normally, fluid pressure lines are formed so as to communicate from the inlet ports 121 to the outlet ports 122 within the fluid pressure unit 10, whereby pedal effort applied to the brake pedal P by the driver is allowed to be transmitted to the respective wheel brakes FL, RR, RR, FR.

Provided in the fluid pressure unit 10 are four inlet valves 1, four outlet valves 2 and four check valves 1a so as to correspond to the respective wheel brakes FL, RR, RL, FR. In addition, two reservoirs 3, two pumps 4, two dampers 5 and two orifices 5a are provided so as to correspond to respective fluid pressure output lines 81, 82 provided to correspond to the output ports M1, M2, and an electric motor 6 is also provided to drive the two pumps 4.

The inlet valves 1 are normally open electromagnetic valves which are disposed on fluid pressure lines (upstream of the respective wheel brakes FL, RR, RL, FR) which extend from the master cylinder M to the respective wheel brakes FL, RR, RL, FR. The inlet valves 1 are normally kept open to thereby permit a brake fluid pressure to be transmitted from the master cylinder M to the respective wheel brakes FL, RR, RL, FR. The inlet valves 1 are closed by the controller 20 when the road wheels T are likely to lockup so as to cut off the transmission of the fluid pressure that is to be transmitted from the brake pedal P to the respective wheel brakes FL, RR, RL, FR.

The outlet valves 2 are normally closed electromagnetic valves which are disposed between the respective wheel brakes FL, RR, RL, FR and the respective reservoirs 3 (on fluid pressure lines which communicate from wheel cylinder W sides of the outlet valves 1 to the master cylinder M via the reservoirs 3 and the pumps 4. Although normally closed, the outlet valves 2 are opened by the controller 20 when the road wheels T are likely to lock up, whereby fluid pressures exerted on the respective wheel brakes FL, RR, RL, FR are released to the respective reservoirs 3.

The check valves 1a are connected in parallel with the corresponding inlet valves 1. The check valves 1a are valves for permitting the flow of brake fluid from the respective wheel brakes FL, RR, RL, FR side to the master cylinder M side only and still permits the flow of brake fluid from the respective wheel brakes FL, RR, RL, FR side to the master cylinder M side even in such a state that the inlet valves 1 are closed with the input from the brake pedal P released.

The reservoirs 3 have a function to take in brake fluid which is released from the respective outlet valves 2 when they are opened.

The pumps 4 have a function to take in the brake fluid taken into the reservoirs 3 so as to return the brake fluid to the master cylinder M via the orifices 5a. By doing this, the respective fluid pressure output lines 81, 82 of which the pressures are reduced as a result of the reservoirs 3 taking in the brake fluid pressure restore their initial pressure levels.

By being controlled to be opened or closed by the controller 20, the inlet valves 1 and the outlet valves 2 control fluid pressures in the wheel cylinders W of the respective wheel brakes FL, RR, RL, FR (hereinafter, also referred to as "caliper pressures"). For example, in a normal state in which the inlet valves 1 are opened, while the outlet valves 2 are closed, with the brake pedal P kept pressed on, a fluid pressure from the master cylinder M is transmitted directly to the wheel cylinders W to create an increased pressure state thereat. On the other hand, with the inlet valves 1 closed and the outlet valves 2 opened, the brake fluid flows out from the wheel cylinders W towards the reservoirs 3 to create a reduced pressure state thereat. In addition, with both the inlet valves 1 and the outlet valves 2 closed, a holding state is created in which the caliper pressures are held.

Figure 3:
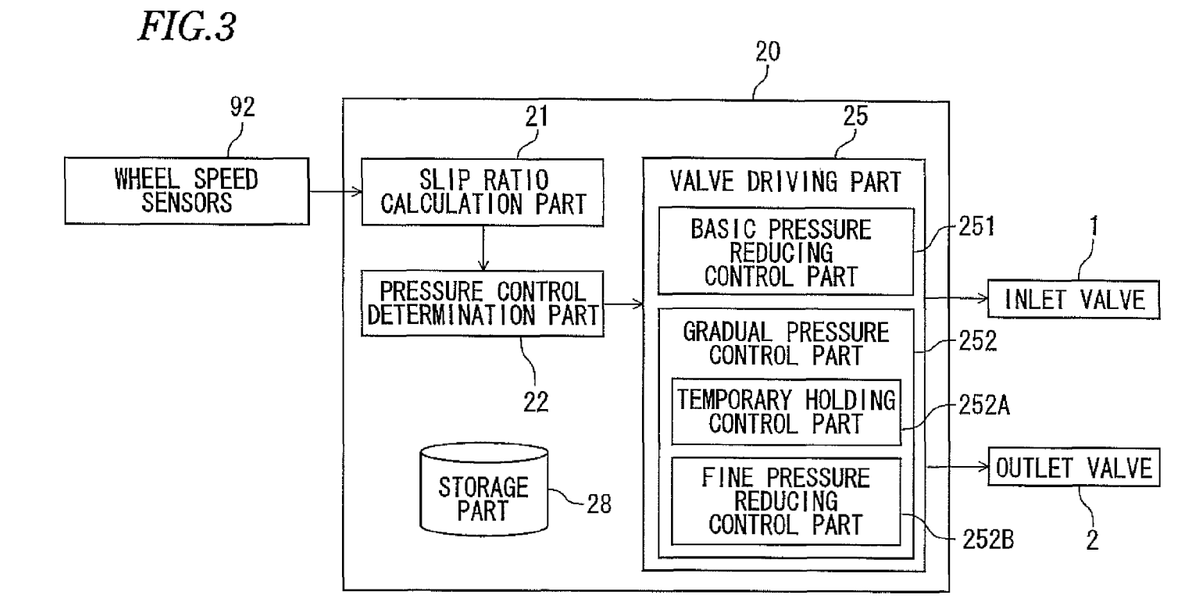
FIG. 3 is a block diagram showing the configuration of a controller.

Next, the controller 20 will be described in detail. As is shown in FIG. 3, with wheel speeds inputted thereinto from the wheel speed sensors 92, the controller 20 controls the inlet valves 1 and the outlet valves 2 based on at least the wheel speeds. The controller 20 has a slip ratio calculating part 21, a pressure control determination part 22, a valve driving part 25 and a storage part 28.

The slip ratio calculating part 21 has a function to calculate slip ratios of the respective road wheels T using a known calculation method based on an output from the wheel speed sensors 92 and to output the slip ratios so calculated to the pressure control determination part. As an example, a slip ratio can be obtained by dividing a difference (a slip ratio) between a vehicle body speed which is estimated from a wheel speed and the wheel speed by the wheel speed.

The pressure control determination part 22 has a function to determine based on the vehicle body speed estimated from the wheel speed and the slip ratio whether the brake fluid pressures (the caliper pressures) of the respective road wheels T are put in the reduced pressure state, the increased pressure state or the holding state and to output the result of the determination to the valve driving part 25. Namely, judging that the road wheels T are likely to lock up in a case that the slip ratios become larger than a predetermined threshold and that a wheel acceleration is 0 or smaller (a wheel deceleration is 0 or larger), the pressure control determination part 22 determines that the caliper pressures be put in the reduced pressure state. In addition, in a case that the wheel acceleration is larger than 0, the pressure control determination part 22 determines that the caliper pressures be put in the holding state. Further, in a case that the slip ratios become equal to or smaller than the predetermined threshold and the wheel acceleration is 0 or smaller, the pressure control determination part 22 determines that the caliper pressures be put in the increased pressure state.

The valve driving part 25 has a function to output a control signal to the inlet valves 1 and the outlet valves 2 in accordance with the indication outputted from the pressure control determination part 22 which indicates the reduced pressure state, the increased pressure state of the holding state. Namely, as has been described above, when attempting to create the reduced pressure state, the inlet valves 1 are closed, while the outlet valves 2 are opened. When attempting to create the increased pressure state, the inlet valves 1 are opened, while the outlet valves 2 are closed. When attempting to create the holding state, both the inlet valves 1 and the outlet valves 2 are closed.

The vehicle brake fluid pressure control apparatus 100 of the embodiment is characterized by a pressure reducing control method in the valve driving part 25. For the purpose of effecting the pressure reducing control, the valve driving part 25 has a basic pressure reducing control part 251 and a gradual pressure reducing control part 252. As will be described in detail later, in this embodiment, a basic pressure reducing control and a gradual pressure reducing control are performed continuously, and the basic pressure reducing control and the gradual pressure reducing control constitute a single pressure reducing cycle. Normally, a single ABS control (normally, a series of controls performed until a brake operation is completed) involves a plurality of pressure reducing cycles.

The basic pressure reducing control part 251 has a function to execute a pressure reducing continuously with a basic pressure reducing amount $P_B$ which is in accordance with an estimated road surface friction coefficient. In a brake pressure control by an anti-lock braking system (ABS), since the larger the road surface friction coefficient is, the more easily the road wheels T are restored from the lockup tendency to the normal state, the pressure reducing amount is desirably made small. On the contrary, since the smaller the road surface friction coefficient is, the more difficult the road wheels T are made to be restored from the lockup state to the normal state, the pressure reducing amount is desirably made large. In this embodiment, as will be described later, since the pressure reducing amount can be increased gradually by performing the gradual pressure reducing control, at the start of ABS control (a first pressure reducing cycle), a suitably large road surface friction coefficient is determined temporarily and this surface friction coefficient is regarded as an estimated value of the road surface friction coefficient. On the other hand, in second and onward pressure reducing cycles after the start of ABS control, a deceleration can be estimated from temporal passage of wheel speeds, and a road surface friction coefficient can be estimated from deceleration.

Then, the basic pressure reducing control part 251 determines the basic pressure reducing amount $P_B$ based on the estimated road surface friction coefficient. Specifically, the basic pressure reducing control part 251 determines the basic pressure reducing amount $P_B$ by reference to a table stored and in the storage part 28 and showing a relationship between road surface friction coefficient and basic pressure reducing amount $P_B$. The basic pressure reducing amount $P_B$ may be increased or decreased based on other parameters such as speed at which the brake pedal is pressed on.

In the second and onward pressure reducing cycles, when the high μ which was temporarily determined is estimated in a determined fashion based on the deceleration of a vehicle body, a basic pressure reducing amount for a high μ road is obtained based on the table.

In addition, in the second and onward pressure reducing cycles, in addition to the road surface friction coefficient which is estimated based on vehicle body seed, the pressure reducing amount in the previous pressure reducing cycle is also important as representing the road surface friction coefficient. Therefore, the basic pressure reducing amount $P_B$ is set (corrected) based on this pressure reducing amount. Specifically, in a case that a fine pressure reducing control was executed in the gradual pressure reducing control in the previous pressure reducing cycle, since this means that only the basic pressure reducing control could not provide a sufficient pressure reducing amount, the basic pressure reducing amount $P_B$ is set larger by a predetermined amount (a predetermined value A1). In a case that the fine pressure reducing control was not performed but only the basic pressure reducing control and a temporary holding control, which will be described later, were performed to complete the pressure reducing cycle in the gradual pressure control in the previous pressure reducing cycle, since this means that only the previous basic pressure reducing control was good enough for the road surface condition at the point in time when the previous pressure reducing control was performed, the basic pressure reducing amount $P_B$ is set smaller by a predetermined amount (a predetermined value A2). By doing this, a more suitable pressure reducing amount can be applied to the current pressure reducing control while observing how much the road wheels T are restored to their normal state. In a case that with the predetermined vale A2 deducted, the basic pressure reducing amount $P_B$ becomes smaller than a preset lower limit value, the basic pressure reducing amount $P_B$ is set to the lower limit value.

The argument that the compensation of the pressure reducing amount of the current pressure reducing cycle based on the pressure reducing amount in the previous pressure reducing cycle is effective is premised that there exists no large change in road surface condition between the previous and current pressure reducing cycles. Therefore, in a case that there is caused a large change in road surface friction coefficient that is estimated from wheel speeds, that is, for example, in a case that the deceleration changes to be decreased, from which it is presumed that the vehicle has moved from the high μ road surface to a low μ road surface, the pressure reducing amount may be determined based on a road surface friction coefficient that is estimated from the wheel speeds (the deceleration) instead of making use of the pressure reducing amount in the previous pressure reducing cycle in the way described above.

Since the previous resultant pressure reducing amounts are used in the second and onward pressure reducing cycles, the number of pressure reducing cycles performed in the series of ABS controls is stored in the storage part 28.

As is shown in FIG. 3, the gradual pressure reducing control part 252 has a temporary holding control part 252A and a fine pressure reducing control part 252B.

The temporary holding control part 252A has a function to hold the fluid pressure for a predetermined period of time on condition that the wheel speeds are indicating a tendency to decrease after the basic pressure reducing amount $P_B$ has been controlled by the basic pressure reducing control part 251 (note that the determination of the condition is arbitrary). Specifically, this predetermined period of time can be referred to as a control cycle of the controller 20 (not one cycle of the "pressure reducing cycle" but one cycle from arithmetic operation of slip ratio to transmission of control signal to the inlet valves 1 and the outlet valves 2). The predetermined period of time may, of course, be set to a longer period of time than the one cycle such as a period of time equal to or longer than two cycles, for example.

The temporary holding control part 252A executes again a temporary holding control after the fine pressure reducing control part 252B has performed a fine pressure reducing control. Namely, in the gradual pressure reducing control, the temporary holding control and the fine pressure reducing control are repeated while the wheel speeds keep the tendency to decrease. The temporary holding control part 252A may execute second and onward temporary holding controls only when the wheel speeds are judged as keeping the tendency to decrease as a result of judgment on whether or not the wheel speeds keep the tendency to decrease after the fine pressure reducing control.

The period of time during which the temporary holding control is performed may be adjusted as required in accordance with the conditions of the vehicle CR. For example, in a case that the road surface friction coefficient is larger than a predetermined threshold and the vehicle body speed is smaller than a predetermined threshold, the predetermined period of time may be set longer than for the normal time. This is because since a situation like this in which the vehicle is driving at low speeds on the high μ road implies that the vehicle is about to come to a halt, the pressure reducing amount can be decreased to a small level by lengthening the time to observe the situation to determine whether or not a pressure reducing is effected, so as to enable the vehicle to stop without any delay, thereby making it possible to improve the braking feeling.

The fine pressure reducing control part 252B has a function to execute a pressure reducing in a pressure reducing amount which is smaller than the basic pressure reducing amount $P_B$ on condition that the wheel speeds tend to decrease after the temporary holding control part 252A has carried out the temporary holding control. The pressure reducing amount employed in this pressure reducing is referred to as a fine pressure reducing amount. In this embodiment, the fine pressure reducing amount can be adjusted by the temporal length of a pulse signal outputted to the outlet valves 2. Namely, the fine pressure reducing amount can be adjusted by a rate at which the pulse signal occupies the control cycle time. In a case that normally closed electromagnetic valves whose valve opening force can be adjusted by energization amount are used as the outlet vales 2, the fine pressure reducing amount can be adjusted by adjusting the energization amount of a signal that is outputted to the outlet valves 2.

The fine pressure reducing amount may be adjusted as required in accordance with the conditions of the vehicle CR. For example, in a case that the road surface friction coefficient is larger than the predetermined threshold and the vehicle body speed is smaller than the predetermined threshold, the fine pressure reducing amount may be set smaller than for the normal time. This is because since the situation like this in which the vehicle is driving at low speeds on the high μ road implies that the braking force becomes relatively large just before the vehicle comes to a halt, in a case that a drastic pressure reducing is performed, a pitching due to a change in braking force is caused, making the driver feel a sensation of physical disorder. Decreasing the fine pressure reducing amount to such a low level in the way described above is facilitated by changing the application time of the pulse signal which effects a single pressure reducing so as to decrease.

In a case that the wheel speeds do not indicate the tendency to decrease after the temporary holding control, the fine pressure reducing part 252B performs no fine pressure reducing control, and the current pressure reducing cycle ends. Note that the holding state continues until the fine pressure reducing control is performed as a result of observation of the tendency of wheels speeds to decrease after the temporary holding control.

The storage part 28 stores the thresholds and the conversion table for the respective controls described above and the ABS control whose description is omitted here.

A pressure reducing control operation by the vehicle brake fluid pressure control apparatus 100 which is configured as has been described heretofore will be described by reference to FIGS. 4 and 5.

Figure 4:
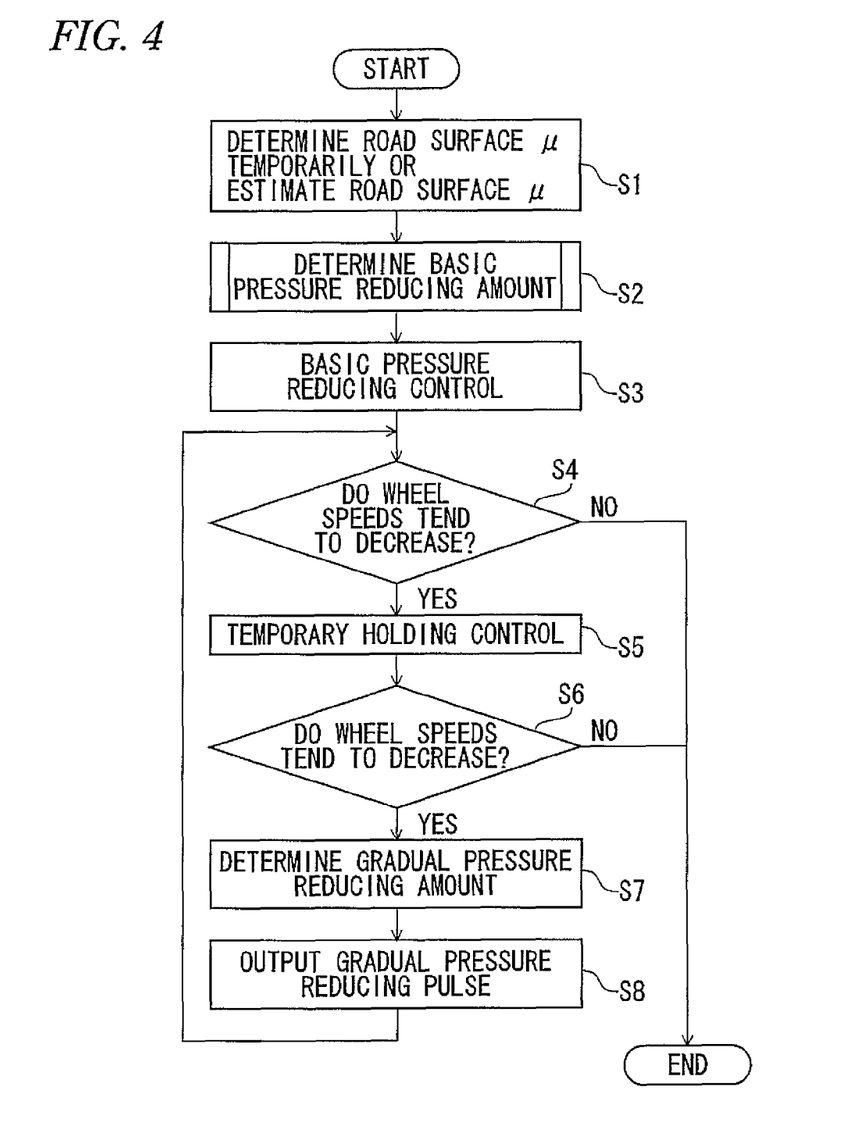
FIG. 4 is a flowchart showing a pressure reducing control operation.

In a case that the pressure control determination part 22 determines that the pressure control state is changed from the increased pressure state or the holding state to the decreased pressure state, as is shown in FIG. 4, the basic pressure reducing control part 251 temporarily determines a road surface $\mu$ for a first pressure reducing cycle or estimates a road surface $\mu$ from wheel speeds for a second or onward pressure reducing cycle (S1). Then, a basic pressure reducing amount $P_B$ is determined based on the road surface $\mu$ (S2).

Figure 5:
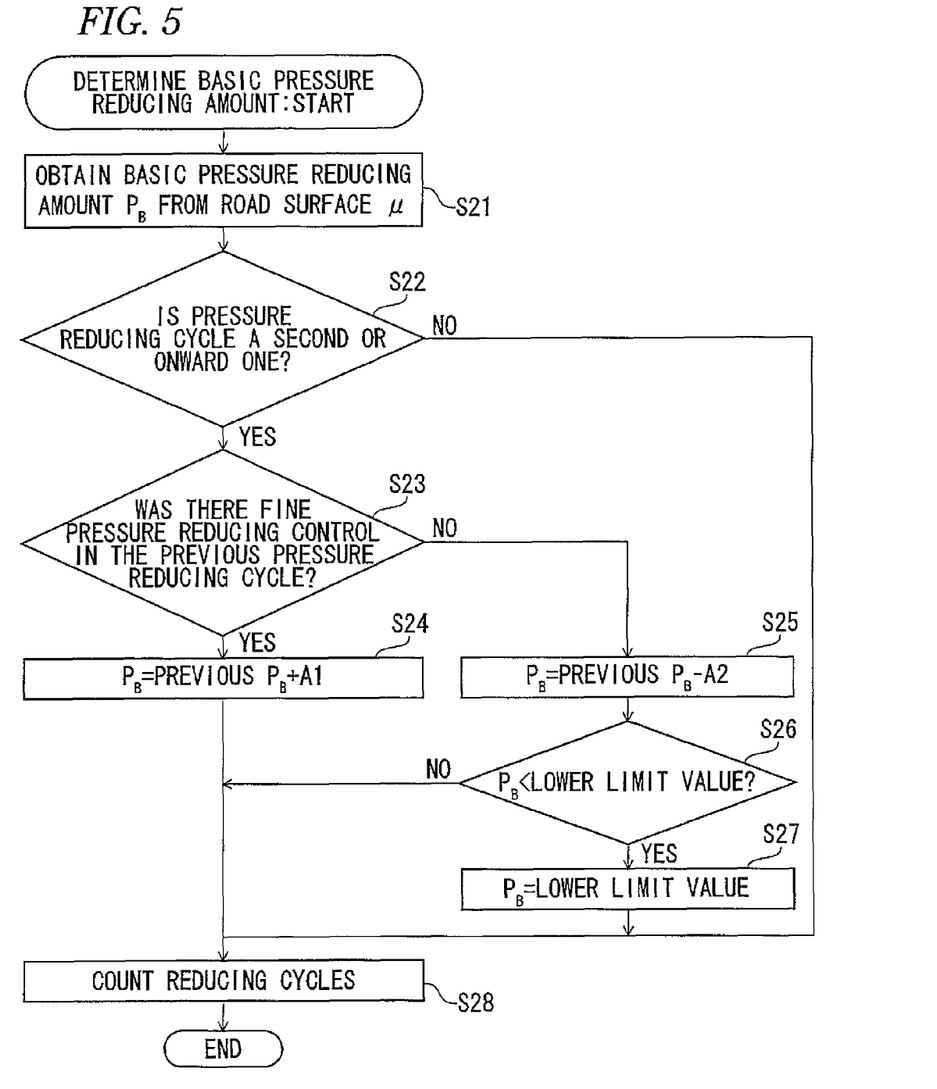
FIG. 5 is a flowchart showing a basic pressure reducing amount determination operation.

The determination of the basic pressure reducing amount $P_B$ is effected as is shown in FIG. 5. Firstly, referring to a table stored in the storage part 28 which shows a relationship between road surface $\mu$ and basic pressure reducing amount $P_B$, a basic pressure reducing amount $P_B$ is obtained from the road surface $\mu$ (S21). Then, if the current pressure reducing cycle is not a second or onward pressure reducing cycle, that is, if the current pressure reducing cycle is a first one (S22, No), proceed to step S28, where the number of pressure reducing cycles is counted. On the other hand, if the current pressure reducing cycle is a second or onward one, it is judged whether or not there was the fine pressure reducing control in the previous pressure reducing cycle (S23), and if it is judged that there was the fine pressure reducing control (S23, Yes), the basic pressure reducing amount $P_B$ is set to a value which results from addition of the predetermined value A1 to the previous value (S24).

On the other hand, if there was no fine pressure reducing control in the previous pressure reducing cycle (S23, No), the basic pressure reducing amount $P_B$ is set to a value which results from deduction of the predetermined value A2 which is a positive value from the previous basic pressure reducing amount $P_B$ (S25). Then, if the compensated basic pressure reducing amount $P_B$ is smaller than the lower limit value stored in the storage part 28 (S26, Yes), the basic pressure reducing amount $P_B$ is set to the lower limit value. After step 24, if the basic pressure reducing amount $P_B$ is determined to be equal to or smaller than the lower limit value in step S26 (S26, No), the number of pressure reducing cycles is counted in step S28 in any case after step S27.

Returning to FIG. 4, the basic pressure reducing control part 251 executes the basic pressure reducing control based on the determined basic pressure reducing amount $P_B$. As this occurs, since it is better to perform the pressure reducing quickly so as to restore the road wheels T from the slipping state as quickly as possible, the pressure reducing is performed with the outlet valves 2 kept open.

Then, it is judged whether or not the wheel speeds tend to decrease (whether or not the wheel acceleration is less than 0) after the basic pressure reducing control has been completed. If it is judged that the wheel speeds do not tend to decrease (S4, No), since this means that the road wheels T have started to follow the road surface, the operation ends without performing the fine pressure reducing control.

If the wheel speeds do not tend to decrease (S4, Yes), the temporary holding control part 252A of the gradual pressure reducing control part 252 closes both the inlet valves 1 and the outlet valves 2 during the single control cycle to execute the temporary holding control (S5).

Then, the fine pressure reducing control part 252B judges whether or not the wheel speeds tend to decrease (whether or not the wheel acceleration is less than 0) after the temporary holding control. If it is judged that the wheel speeds do not tend to decrease (S6, No), since this means that the road wheels T have started to follow the road surface, the operation ends without performing the fine pressure reducing control. On the other hand, if it is judged that the wheel speeds tend to decrease (S6, Yes), since this means that the lockup tendency of the road wheels T has not yet been eliminated, the fine pressure reducing control part 252B determines a gradual pressure reducing amount (S7). The gradual pressure reducing amount is an amount which is smaller than the basic pressure reducing amount $P_B$ and one stored in the storage part 28 is obtained as the gradual pressure reducing amount. As has been described before, a fine pressure reducing amount which is smaller than the fine pressure reducing amount for the normal time is stored in the storage part 28 as a gradual pressure reducing amount for a low-speed driving on a high $\mu$ road, so that this small value so stored may be picked up in a case that the road surface friction coefficient is larger than the predetermined threshold and the vehicle body speed is smaller than the predetermined threshold.

Then, the fine pressure reducing control part 252B outputs a pulse signal having a temporal length matching the determined gradual pressure amount to the output valves 2 (S8). Thereafter, the operation returns to step S4, and the series of operations is repeated until the wheel speeds do not indicate the tendency to decrease.

Behaviors of the vehicle CR and the operation of the pressure reducing control by the vehicle brake fluid pressure control apparatus 100 will be described by reference to FIGS. 6A to 7C.

Figure 6A:
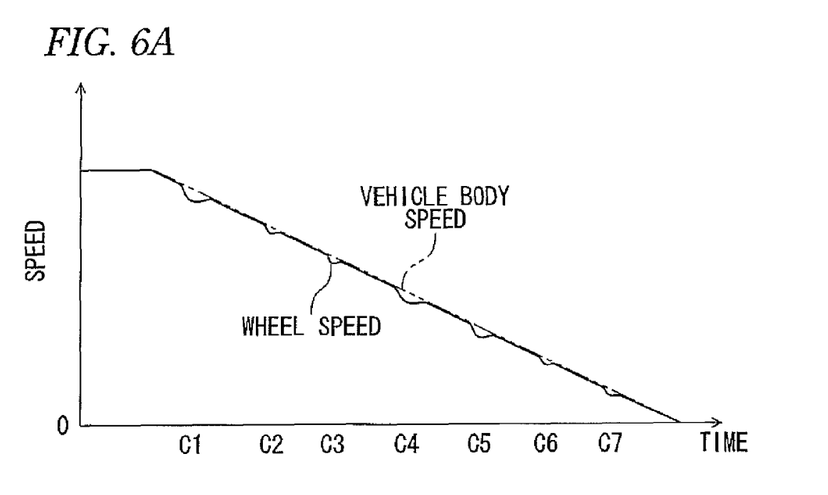
FIG. 6A is a graph showing changes of vehicle body speed and wheel speed with time and FIG. 6B is a graph showing pressure reducing amounts at pressure reducing cycles.
Figure 6B:
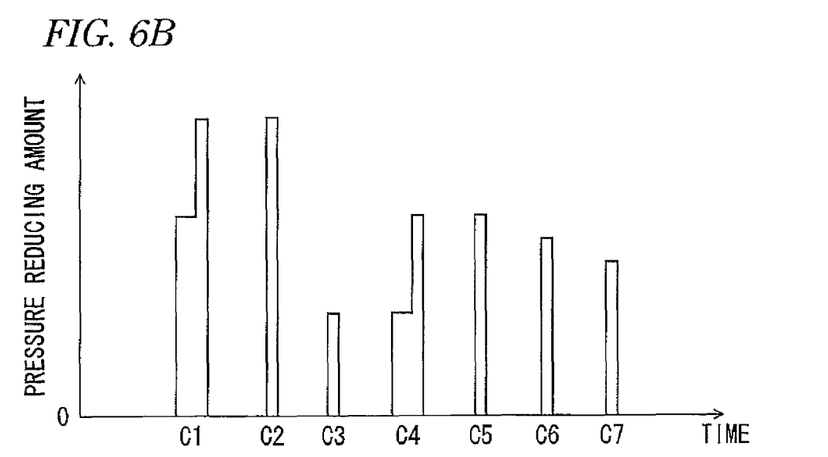

As is shown in FIGS. 6A and 6B, when the brakes are applied in the vehicle CR and the road wheels T tend to lock, the wheel speeds become smaller than the vehicle body speed, which increases the slip ratio. When the slip ratio becomes larger than a predetermined threshold, as is shown at times C1 to C7, pressure reducings in predetermined pressure reducing amounts are executed. Reference numeral characters C1 to C7 are also used to specify respective pressure reducing cycles shown in FIGS. 6A and 6B, and the pressure reducing amount is reset for each pressure reducing cycle.

Figure 7A:
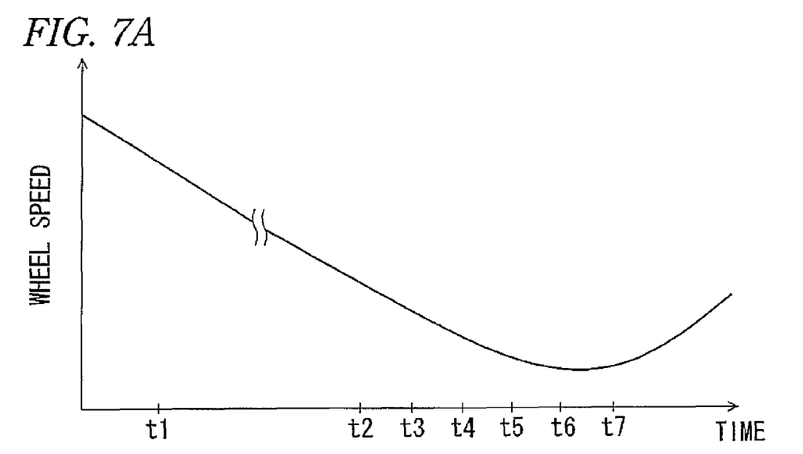
FIG. 7A is a graph showing a change of wheel speed with time at a single pressure reducing cycle.
Figure 7B:
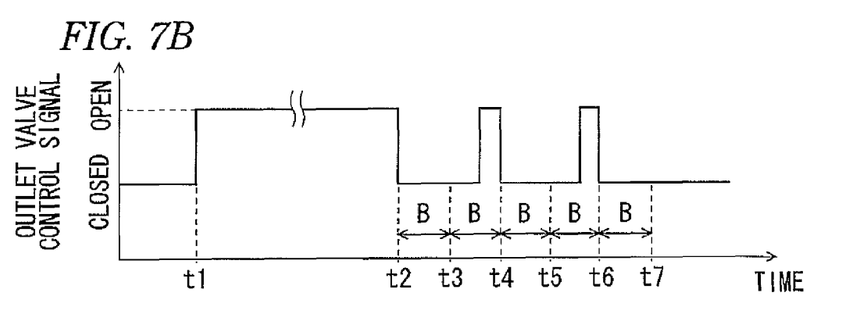
FIG. 7B is a graph depicting a control signal of an outlet valve.
Figure 7C:
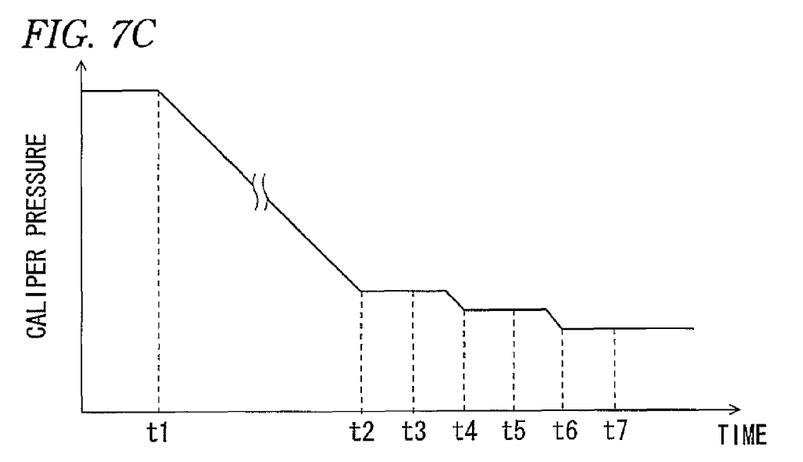
FIG. 7C is a graph showing a change of caliper pressure with time.

FIGS. 7A to 7C show wheel speeds (FIG. 7A), outlet valve control signal (FIG. 7B) and caliper pressures (FIG. 7C) by expanding the time scale in a pressure reducing cycle C1, for example. However, they do not strictly correspond to any of the pressure reducing cycles shown in FIGS. 6A and 6B but show a representative state for explanation.

In FIGS. 7A to 7C, when the slip ratio of the vehicle CR increases gradually and exceeds a predetermined threshold at time t1, the pressure reducing control is started. As this occurs, the basic pressure reducing amount $P_B$ is determined based on the estimated (temporarily determined) road surface friction coefficient, and the inlet valves 1 are closed, while the outlet valves 2 are opened over a relatively long period of time (t1 to t2). By doing this, the caliper pressures are reduced largely at time t1 to t2, whereby the lockup tendency of the road wheels T starts to be eliminated.

After this basic pressure reducing control, the temporary holding control part 252A performs the temporary holding control from time t2 to time t3. In FIG. 7B, a time width or period indicated by B denotes a length of one cycle of the control cycle, and the temporary holding control is performed continuously over the time period B.

At time t3, the fine pressure reducing control part 252B judges whether or not the wheel speeds tend to decrease. Since it judges that the wheel speeds still tend to decrease, the fine pressure reducing part 252B opens the outlet valves 2 only for a predetermined period of time which is shorter than the basic pressure reducing amount $P_B$. In this case, the predetermined period of time can be referred to as a predetermined rate of the time period B, for example, and the fine pressure reducing amount can be adjusted by controlling this time period.

At time t4, the temporary holding control part 252A performs again the temporary holding control. Then, since the tendency of the wheel speeds to decrease is not yet eliminated even at time t5, the fine pressure reducing control part 252B performs again the fine pressure reducing control. Then, at time t6 the temporary holding control is performed further. Since the wheel speeds have started to indicate a tendency to increase at time t7, the pressure reducing control ends.

In this way, in the pressure reducing control according to the embodiment, not only is the pressure reduced largely in the basic pressure reducing amount $P_B$ which corresponds to the road surface friction coefficient by the basic pressure control, but also the pressure reducing amount is increased gradually thereafter while observing how much the road wheels T are recovered from the lockup tendency. Therefore, the pressure reducing control with the suitable pressure reducing amount can be realized by setting the basic pressure reducing amount $P_B$ slightly smaller.

Returning to FIGS. 6A and 6B to observe a change in basic pressure reducing amount $P_B$, since no road surface friction coefficient can be estimated in a pressure reducing cycle C1, a basic pressure reducing amount $P_B$ is obtained based on a temporary presumption that the vehicle is driving on a relatively high μ road. Then, since the pressure reducing amount provided by the basic pressure reducing control only is not sufficient, an additional pressure reducing is performed by the gradual pressure reducing control.

Then, in a pressure reducing cycle C2, since the fine pressure reducing control was performed in the previous pressure reducing cycle C1, the basic pressure reducing control is performed with the basic pressure reducing amount $P_B$ increased by the predetermined value A1. The pressure reducing control ends without performing any additional pressure reducing (fine pressure reducing control).

In a pressure reducing cycle C3, a sufficient history of pressure reducings is accumulated and a road surface friction coefficient can be estimates with sufficient accuracy. Therefore, determining that the vehicle is driving on the high μ road, a basic pressure reducing amount $P_B$ is obtained based on the determined road surface friction coefficient, and the basic pressure reducing control is executed by employing the basic pressure reducing amount $P_B$ so obtained. Then, the pressure reducing control ends without performing the fine pressure reducing control.

In a pressure reducing cycle C4, since the fine pressure reducing control was not performed in the previous pressure reducing cycle C3, according to the principle way of determination, a value is taken as a basic pressure reducing amount $P_B$ which results from deduction of the predetermined value A2 from the previous basic pressure reducing amount $P_B$. However, the lower limit value of the basic pressure reducing amount PB was adopted as the pressure reducing amount because the pressure reducing amount in the pressure reducing cycle C3 was determined based on the determination that the vehicle was running on the high μ road. Thus, the basic pressure reducing control is performed using the basic pressure reducing amount $P_B$ in the previous pressure reducing cycle C3 directly as the current basic pressure reducing amount $P_B$, and an additional pressure reducing is performed by the fine pressure reducing control.

In a pressure reducing cycle C5, since the fine pressure reducing control was performed in the previous pressure reducing cycle C4, the basic pressure reducing control is performed using the total pressure reducing amount in the previous pressure reducing cycle C4 as a basic pressure reducing amount $P_B$, and the pressure reducing control ends without performing the fine pressure reducing control.

In a pressure reducing cycle C6, since the fine pressure reducing control was not performed in the previous pressure reducing cycle C5, a value is taken as a basic pressure reducing amount $P_B$ which results from deduction of the predetermined value A2 from the previous basic pressure reducing amount $P_B$. Then, the pressure reducing control ends without performing the fine pressure reducing control.

In a pressure reducing control C7, similar to the pressure reducing control C6, since the fine pressure reducing control was not performed in the previous pressure reducing cycle C6, a value is taken as a basic pressure reducing amount $P_B$ which results from deduction of the predetermined value A2 from the previous basic pressure reducing amount $P_B$. Then, the pressure reducing control ends without performing the fine pressure reducing control.

Thus, as has been described heretofore, according to the vehicle brake fluid pressure control apparatus 100 of the embodiment, after the basic pressure reducing control based on the road surface friction coefficient is performed when the brakes are applied in the vehicle, the temporary holding control is performed in which the holding control is performed for at least the predetermined period of time and the fine pressure reducing control in the reducing amount smaller than the basic pressure reducing amount $P_B$ is performed only when the wheel speeds still tend to decrease after the temporary holding control. Therefore, the basic pressure reducing amount PB can be set to the value which is not too large, thereby making it possible to realize the pressure reducing control with the suitable pressure reducing amount. As a result of this, an extra pressure reducing can be prevented on the high μ road and a delay in increasing the pressure can also be prevented. In addition, the change in brake fluid pressure can be minimized, thereby making it possible to improve the braking feeling.

In particular, with the gradual pressure reducing control, by executing the temporary holding control and the fine pressure reducing control repeatedly while the wheel speeds tend to decrease, it is possible to execute the pressure reducing control with the suitable pressure reducing amount for the restoration tendency of the road wheels T from the lockup state.

In the driving condition where the vehicle is driving at low speeds on the high μ road, by making the fine pressure reducing amount smaller than those for any other driving conditions, a pitching is restricted from occurring just before the vehicle comes to a halt, thereby making it possible to obtain a preferred braking feeling which matches pedal effort exerted on the brake pedal by the driver.

As has been described above, the suitable basic pressure reducing amount PB for the current road surface conditions can be set by reference to the previous pressure reducing cycle, thereby making it possible to execute the pressure reducing control with the suitable pressure reducing amount which can be realized quickly.

Thus, while the embodiment of the invention has been described heretofore, the invention is not limited to the embodiment and hence can be modified in various ways. For example, in the embodiment, while the vehicle brake fluid pressure control apparatus has been described as being applied to the vehicle brake fluid pressure control apparatus which executes the ABS control, the invention can also be applied to a vehicle behavior control apparatus for stabilizing the behavior of a vehicle.

In the embodiment, while the road surface friction coefficient is described as being estimated based on deceleration calculated from wheel speeds, other known method for estimating a road surface friction coefficient may be adopted. For example, a road surface friction coefficient may be estimated based on the detection results of an acceleration sensor.

The basic pressure reducing amount $P_B$ may be compensated based on the total pressure reducing amount of the pressure reducing amounts used in the basic pressure reducing control and the gradual pressure reducing control in the previous pressure reducing cycle. For example, in a case that the fine pressure reducing control was executed in the gradual pressure reducing control in the previous pressure reducing cycle, since it is considered that the pressure reducing amount resulting from addition of the pressure reducing amount used in the fine pressure reducing control to the basic pressure reducing amount was appropriate, the total pressure reducing amount of the pressure reducing amounts used in the basic pressure reducing control and the gradual pressure reducing control in the previous pressure reducing cycle may be adopted as the current basic pressure reducing mount $P_B$.

What is claimed is:

1. A vehicle brake fluid pressure control apparatus for controlling a fluid pressure generated in a fluid pressure source based on at least a wheel speed for transmission to a wheel brake, comprising:
    a normally open electromagnetic valve which is disposed on a fluid pressure line extending from the fluid pressure source to the wheel brake;
    a normally closed electromagnetic valve which is disposed on a fluid pressure line extending from the wheel brake to the fluid pressure source; and
    a controller configured to control a fluid pressure in the wheel brake to increase or reduce by controlling the normally open electromagnetic valve and the normally closed electromagnetic valve, wherein
    the controller performs:
    a pressure reducing in a pressure reducing cycle in which a basic pressure reducing control and a gradual pressure control are performed continuously in a case that the controller determines to execute a pressure reducing control with wheel speed decreasing;
    a pressure reducing control in a basic pressure reducing amount in the basic pressure reducing control; and
    a temporary holding control for holding the fluid pressure and a fine pressure reducing control for executing a pressure reducing in an amount smaller than the basic pressure reducing amount in a case that the wheel speed tend to decrease after the temporary holding control in the gradual pressure reducing control.

2. The vehicle brake fluid pressure control apparatus according to claim 1, wherein
    the controller repeats the temporary holding control and the fine pressure reducing control while the wheel speed tend to decrease in the gradual pressure reducing control.

3. The vehicle brake fluid pressure control apparatus according to claim 1, wherein
    a pressure reducing amount in the fine pressure reducing control is made small in a case that an estimated road surface friction coefficient is larger than a predetermined threshold and a vehicle body speed is smaller than a predetermined threshold.

4. The vehicle brake fluid pressure control apparatus according to claim 3, wherein
    when making small the pressure reducing amount in the fine pressure reducing control, an application time of a pulse signal for a single pressure reducing is shortened.

5. The vehicle brake fluid pressure control apparatus according to claim 1, wherein
    a predetermined time to hold the fluid pressure in the temporary holding control is lengthened in a case that the estimated road surface friction coefficient is larger than the predetermined threshold and the vehicle body speed is smaller than the predetermined threshold.

6. The vehicle brake fluid pressure control apparatus according to claim 1, wherein
    the basic pressure reducing amount is compensated based on a total pressure reducing amount of pressure reducing amounts used in the basic pressure reducing control and the gradual pressure reducing control in the previous pressure reducing control.

7. The vehicle brake fluid pressure control apparatus according to claim 1, wherein
    in a case that the fine pressure reducing control is not executed in the gradual pressure reducing control in the previous pressure reducing cycle, the basic pressure reducing amount is set so as to be smaller by a predetermined amount than that in the previous pressure reducing cycle.

8. The vehicle brake fluid pressure control apparatus according to claim 1, wherein
    in a case that the fine pressure reducing control is executed in the gradual pressure reducing control in the previous pressure reducing cycle, the basic pressure reducing amount is set so as to be larger by a predetermined amount than that in the previous pressure reducing cycle.

* * * * *